United States Patent [19]

Rowlette

[11] Patent Number: 4,542,082

[45] Date of Patent: Sep. 17, 1985

[54] BIPOLAR BATTERY PLATE

[75] Inventor: John J. Rowlette, Monrovia, Calif.

[73] Assignee: California Institute of Technology, Pasadena, Calif.

[21] Appl. No.: 346,414

[22] Filed: Feb. 8, 1982

[51] Int. Cl.[4] ............................................. H01M 6/48
[52] U.S. Cl. .................................. 429/210; 429/160; 339/59 M
[58] Field of Search ............. 429/210, 160; 339/17 M, 339/17 LM, 59 M

[56] References Cited

U.S. PATENT DOCUMENTS

| | | | |
|---|---|---|---|
| 627,009 | 6/1899 | Paget | 429/210 X |
| 3,553,019 | 1/1971 | Bushrod et al. | 426/160 |
| 3,680,037 | 7/1972 | Nellis et al. | 339/61 M |
| 3,723,181 | 3/1973 | Oakley | 429/210 X |
| 3,817,788 | 6/1974 | Eckerbom et al. | 429/210 X |
| 3,862,790 | 1/1975 | Davies et al. | 339/17 LM |
| 3,982,320 | 9/1976 | Buchoff et al. | 339/17 LM |
| 4,008,300 | 2/1977 | Ponn | 339/17 M X |

FOREIGN PATENT DOCUMENTS 1090075 11/1967 United Kingdom ............... 429/160

*Primary Examiner*—Brian E. Hearn
*Assistant Examiner*—Stephen J. Kalafut
*Attorney, Agent, or Firm*—Marvin E. Jacobs

[57] ABSTRACT

A liquid-impermeable plate (10) having throughplate conductivity with essentially zero resistance comprises an insulator sheet (12) having a series of spaced perforations (14) each of which contains a metal element (16) sealingly received into the perforation (14). A low-cost plate can readily be manufactured by punching a thermoplastic sheet (40) such as polypropylene with a punching tool (52), filling the apertures with lead spheres (63) having a diameter smaller than the holes (50) but larger than the thickness of the sheet, sweeping excess spheres (62) off the sheet with a doctor blade (60) and then pressing a heated platen (74) onto the sheet to swage the spheres into a cylindrical shape and melt the surrounding resin to form a liquid-impermeable collar (4) sealing the metal into the sheet.

9 Claims, 6 Drawing Figures

BIPOLAR BATTERY PLATE

ORIGIN OF THE INVENTION

The invention described herein was made in performance of work under a NASA contract and is subject to the provisions of Section 305 of the National Aeronautics and Space Act of 1958, Public Law 83-568 (72 Stat 435; 42 USC 2457).

TECHNICAL FIELD

The present invention relates to storage or secondary batteries, more specifically, the present invention relates to an improved bipolar plate for use in lead-acid batteries.

BACKGROUND OF THE INVENTION

The largest single application of lead-acid storage batteries is for the starting, lighting and ignition of automobiles, trucks and buses. These batteries are charged automatically from a generator driven by the engine while it is running and they supply power for the lights while the engine is shut down and for ignition and cranking when the engine is started. Lead-acid storage batteries are widely used in aircraft and boats with virtually unlimited applications also existing in non-motive situations.

Lead-acid batteries are formed from a series of leadacid cells. A lead-acid cell consists essentially of positive plates containing positive acitve materials such as lead dioxide and negative plates containing negative active material such as sponge lead immersed in an electrolyte solution, typically dilute sulfuric acid. The respective positive or negative plates are connected in parallel. The power or current of the cell is determined by the number and size of the plates. The open circuit potential developed between each positive and negative plate is about 2 volts. Since the plates are connected in parallel, the combined potential for each cell will also be about 2 volts regardless of the number of plates utilized in the cell. One or more cells are then connected in series to provide a battery of desired voltage. Common low voltage batteries of 6 volts have 3 serially connected cells, 12 volt batteries include 6 serially connected cells and 24 volt batteries contain 12 serially connected cells.

The positive and negative plates are typically oriented vertically in a horizontal stacked relationship. As a result of this vertical orientation, electrolyte stratification commonly occurs vertically along the plate surfaces. This results in decreased battery performance. Some attempts have been made to prevent electrolyte stratification such as by stirring electrolyte by means of various mixing systems. These mixing systems are not only cumbersome but are expensive and subject to failure during the life of a particular battery.

Another problem with lead-acid batteries is their limited lifetime due to shedding of the active materials from the positive and negative plates. Pasted plate lead-acid batteries are by far the most common type of lead-acid battery. Typically, a paste of lead oxide is applied to the surface of the positive and negative grids. On application of electric potential, the lead oxide paste on the positive grid is oxidized to lead dioxide and lead oxide of the negative grid is reduced to sponge lead. During operation these electrode materials shed and flake and fall down between the vertically oriented plates and accumulate at the bottom of the battery. After a period of operation sufficient flakes accumulate to short circuit the grids resulting in a dead battery cell and shortened battery life.

Lead-acid batteries are inherently heavy due to use of the heavy metal led in constructing the plates. Modern attempts to produce lightweight lead-acid batteries, especially in the aircraft electric car and vehicle field, have placed their emphasis on producing thinner plates from lighter weight materials used in place of and in combination with lead. The thinner plates allow the use of more plates for a given volume, thus increasing the power density. Some of these attempts have included battery structures in which the plates are stacked in horizontal configurations. Higher voltages are provided in a bipolar battery including bipolar plates capable of through-plate conduction to serially connect electrodes or cells. The horizontal orientation of the grids prevents the accumulation of flake lead compounds at the battery bottom. Downward movement can be blocked by use of glass mat to contain the electrolyte. Also, stratification of electrolyte is confined and contained within the acid resistant glass mats by capillary action.

The bipolar plates must be impervious to electrolyte and be electrically conductive so that electrical current is conducted perpendicularly there-through to provide a serial connection. The bipolar plates also preferably provide a continuous surface to prevent sluffing off of active materials from the grids.

Most batteries utilizing bipolar plates have used metallic substrates such as lead or lead alloys. The use of lead alloys, such as antimony, gives strength to the substrate but causes increased corrosion and gassing. In addition to the problems of forming a liquid tight seal between the metallic substrate and adjacent nonconductive case (frame) materials, substrate corrosion, weight and strength factors have also been unacceptable. Furthermore, any attempt to reduce weight has lead to increased problems of strength and corrosion. Accordingly, a different approach must be used if acceptable weight and life are to be simultaneously achieved.

Alternate approaches have included plates formed by dispersing conductive particles or filaments such as carbon, graphite or metal in a resin binder such as polystyrene incorporating therein metal or graphite powder (U.S. Pat. No. 3,202,545), a plastic frame of polyvinyl chloride with openings carrying a battery active paste mixed with nonconductive fibers and short noncontacting lead fibers for strengthening the substrate (U.S. Pat. No. 3,466,193) a biplate having a layer of zinc and a polyisobutylene mixed with acetylene black and graphite particles for conductivity of the plate (U.S. Pat. No. 3,565,694), a substrate for a bipolar plate including polymeric material and vermicular expanded graphite (U.S. Pat. No. 3,573,122), a rigid polymer plastic frame having a grid entirely of lead filled with battery paste (U.S. Pat. No. 3,738,871), a plastic thin substrate having lead stripes on opposite faces, the lead stripes being interconnected through an opening in the substrate, and retained by plastic retention strips (U.S. Pat. No. 3,819,412) and a biplate having a substrate of thermoplastic material filled with finely divided vitreous carbon and a layer of lead antimony foil bonded to the substrate for adhering active materials (U.S. Pat. No. 4,098,967).

Some more recent examples of batteries containing bipolar plates are U.S. Pat. No. 4,275,130 in which the biplate construction comprised a thin composite of randomly oriented conductive graphite, carbon or metal fibers imbedded in a resin matrix with stripes of lead plated on opposite surfaces thereof. My copending application Ser. No. 279,841 filed July 2, 1981, now abandoned entitled BIPOLAR SEPARATE CELL BATTERY FOR HIGH OR LOW VOLTAGE includes a biplate formed of a thin sheet of titanium is covered with a layer of epoxy resin containing graphite powder.

The resistance of such plates is always higher than predicted or desired due to the conducting path being formed point to point contact of the dispersed conductive particles which are surrounded by highly insulative resin materials. The through-plate serial conductivity is limited and since the voltage of the cell is increased by including more bipolar plates; this increases the resistance of each cell and of the battery.

SUMMARY OF THE INVENTION

It has now been discovered in accordance with the present invention that an electrolyte-impermeable bipolar plate can be provided having essentially no grid resistance and allowing no sluffing of active materials. The bipolar plate of the invention has a conductivity substantially higher than the lightweight, thin composite bipolar plates discussed above.

The bipolar plate of the invention is formed of a continuous sheet of resinous material containing a plurality of spaced conductors extending from a first surface to the second surface thereof. The conductors are sealingly received in the sheet of resin such that no liquid passes between the resin enveloping the end of the conductor facing each surface thereof. The bipolar plate of the invention can readily be manufactured in a very low cost, repetitive manner to provide a lightweight, inexpensive biplate.

One very simple efficient manner for producing the bipolar plate of the invention is to provide a series of spaced apertures in a thermo-plastic sheet that are slightly larger in diameter than metal pellets. The pellets are preferably sized of a diameter slightly smaller than the diameter of the holes but somewhat larger than the thickness of the sheet. The sheet is then passed through a chamber where it is covered with lead pellets. The pellets enter the apertures. The sheet is then moved upwardly in an amount equal to the excess diameter of pellets. The excess pellets are swept from the top of the sheet and the sheet is then rolled or pressed with a heated platen whereby the plastic melts and the lead pellets are partially flattened and expanded forcing the lead into the plastic. When the plastic cools it forms a seal completely around each lead pellet which is now in the form of a cylinder having opposite ends exposed coincident to the opposite surfaces of the sheet. The process is capable of very high production rates to form low cost bipolar plates in a simple and efficient manner.

These and many other features and attendant advantages of the invention will become apparent as the invention becomes better understood by reference to the following detailed description when considered in conjunction with the accompanying drawings.

Detailed Description of the Invention

Figure 1:
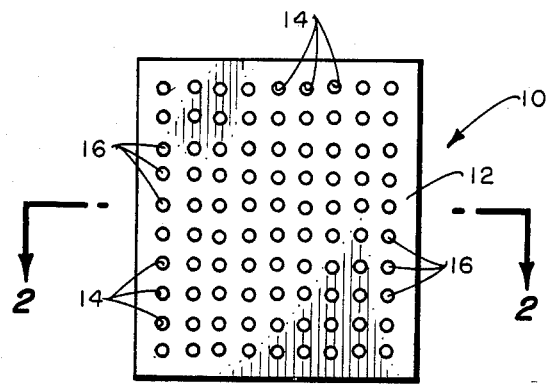
FIG. 1 is a front view in elevation of a bipolar plate in accordance with the invention.
Figure 2:
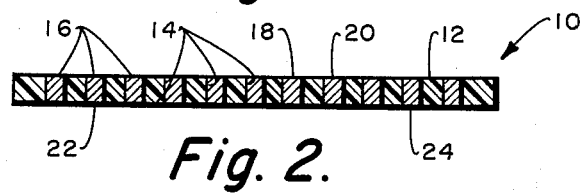
FIG. 2 is a sectional view taken along line 2—2 of FIG. 1.

Referring now to FIGS. 1 and 2 a bipolar plate 10 in accordance with the invention comprises an insulator sheet 12 in which is formed a pattern of spaced perforations 14. Each perforation 14 containing a conductive metal element 16 having a face 18 facing the front surface 20 of the plate 10 and a face 22 facing the opposite surface 24 of the plate 10. The elements 16 are sealingly received in the perforations 14 such that the sheet 12 is impervious to liquid electrolyte. The plate is preferably thin to reduce mass and volume of the battery. The thickness of the sheet is generally from 5 mils to 100 mils, preferably from 10 to 30 mils. The metal elements generally occupy about 10 to 40% by volume of the sheet. The elements can have any geometrical configuration. They preferably are cylindrical in shape but may have a rectangular or other polygonal cross-section. The preferred diameter size of the elements is in the range of 30 to 60 mils providing a preferred center-to-center spacing of 150 to 250 mils.

The insulator sheet can be formed of any liquid impermeable electrical insulator but is preferably formed of a synthetic organic resin which is inert to the electrochemical environment of the cell. Flexible resins are more suitable to avoid brittle failure. Thermoplastic resins are required in the mass production technique of the present invention since they more readily form fluid-tight seals with the metal elements. Polyolefins, particularly the aliphatic polyalkenes such as polyethylene or polypropylene, are thermoplastic, resilient and enert to the electrolyte. Polypropylene and polyethylene also melt at a temperature below that of the low melting metals such as lead which is necessary to avoid perforation of the metal element. Polypropylene is the material of choice since it is a tough, resilient, thermoplastic, melting below the melting point of lead and has excellent resistance to the electrochemical environment of the lead-acid battery, possibly exceeding that of epoxy resins.

The metal elements can be formed of any good conductor inert to the electrochemical environment of the cell. Lead is most preferred due to the inert character of this material, its ready availability and moderate cost. The elements can be formed into the sheet by casting techniques. The preferred manufacturing process of the invention proceeds by placing the elements into preformed apertures and sealing the elements into thermoplastic sheets.

Though the optimum shape for the element is a short cylinder, it is difficult to implant this shape and reliably seal it into a preformed aperture. A spherical element is not an optimum shape. However, spheres can readily be inserted into the apertures and by a combination of heat and pressure, the sphere is deformed by swaging to a shape approximating a cylinder and the surrounding thermoplastic resin is melted, stretched and compressed to provide a liquid impermeable sheath around the element.

In order to practice this technique, the aperture should be slightly larger than the diameter of the sphere, generally providing a clearance of at least 5 mils to 20 mils. The spheres should have a diameter 10 to 30 mils larger than the thickness of the sheet and a volume exceeding that of the aperture so that the sphere can be swaged into cylindrical shape while forming a seal with the surrounding resin.

Figure 3:
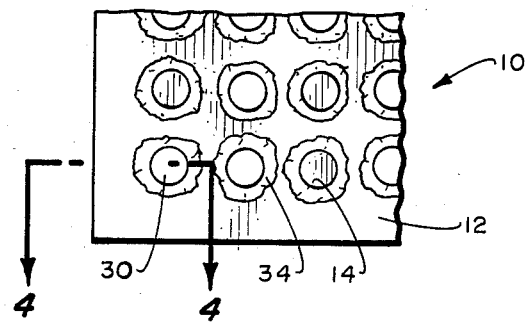
FIG. 3 is an enlarged view of a portion of the bipolar plate.
Figure 4:
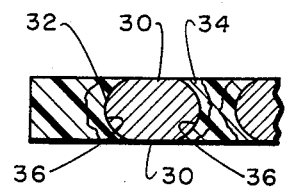
FIG. 4 is a sectional view taken along line 4—4 of FIG. 3.

Referring now to FIGS. 3 and 4, as a result of the application of a heated platen to the sheet 10 containing the sphere, the top surface of spheres will be swaged or mashed into a flat disc 30, the surrounding resin will melt and flow onto the peripheral curved edge 32 to form a sealing ring 34. The element retains its spherical shape along the side portions 36 within the sheet.

Figure 6:
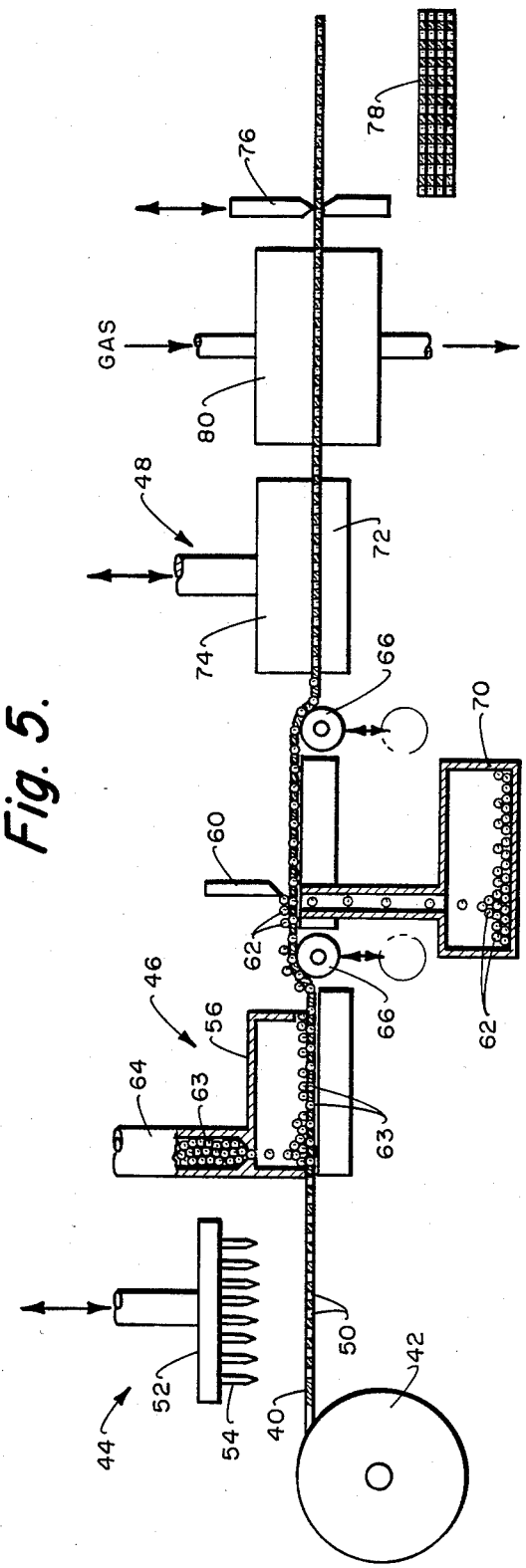
FIG. 6 is a schematic view of a continuous system for manufacturing bipolar plates according to the invention.

Referring now to FIG. 6, a continuous, low-cost process for rapidly producing lightweight bipolar plates with essentially zero electrical resistance comprising the steps of perforating a thermoplastic sheet, filling the perforations with metal spheres having a diameter smaller than the perforations but larger than the thickness of the sheet, raising the sheet to sweep off excess spheres and heating and pressing the sheet with a heated platen or roller to swage the spheres into the sheet. The sheet can be rolled or cut into lengths for use as bipolar plates.

The thermoplastic sheet 40 is passed from supply roll 42 past the perforation station 44, filling station 46, and pressing station 48 before being cut into lengths or re-rolled. While in the perforation station 44 of the equipment train, a series of pilot holes 50 are formed in the sheet 40 by vertically passing punching tool 52 containing a plurality of punch rods 54 through the sheet 40.

The perforated sheet then enters chamber 56 of the filling station. Spheres are fed onto the surface 58 of the sheet 40 from storage container 64. Retractable rollers 66 are then actuated to raise the sheet so that the top of the spheres are not protruding above the top surface 58 of the sheet. The sheet then passes under doctor blade 60 which sweeps the excess spheres 62 off the sheet and into basin 70.

Support rollers 66 are then retracted and the sheetsphere assembly is passed between stationary support 72 and heated platen 74. The heated platen is moved downwardly to apply heat and pressure to the sheet which results in flattening of the ends of the spheres and heating, softening and sealing of the surrounding resin. The sheet is optionally cooled by passage through a cooling station 80. Blade 76 is then actuated to form individual bipolar plates 78.

In a particular embodiment a 65-mil thick polyethylene sheet was drilled to provide apertures having a diameter of about 100 mils. Lead pellets having a diameter of about 85-90 mils were placed in each apertures. The sheet was heated and pressed to seat and seal the pellets in the sheet. Twenty percent of the volume of the final sheet is lead. The weight of a bipolar plate, the size and shape of a grid from a Globe-Union EV 2-13 battery would be 36.6 grams. This compares to 120.9 grams for the EV 2-13 grid and the resistance of the bipolar plate of the invention will be lower by a factor of several million.

Though the bipolar plate has been exemplified with lead conductors for the lead-acid battery, it also could be utilized with nickel, iron, zinc or cadmium pellets in a polyolefin such as polypropylene for nickel-alkaline batteries.

The bipolar plate of the invention is a liquid impervious, zero resistance, through plate conductor having application in any stacked electrochemical cell in which it is desired to provide conduction to an adjacent electrode or an adjacent cell. The plate can be used in batteries, electrolysis cells, fuel cells, electrophoresis cells, etc. The plate can be used in cells with vertically or horizontally disposed cells. The preferred cell configuration is horizontal since horizontal disposition of a cell prevents electrolyte stratification and the continuous, flat surface of the bipolar plate of the invention will prevent shedding of active electrode material, the most prominent failure mode for lead-acid cells.

A particular, efficient, horizontal battery configuration is disclosed in my copending application, Ser. No. 279,841, filed July 2, 1981, entitled BIPOLAR SEPARATE CELL BATTERY FOR HIGH OR LOW VOLTAGE, the disclosure of which is expressly incorporated herein by reference. In that application, bipolar plate groupings are placed between monopolar plates to increase available potential voltage. The conductive plate of the invention can be utilized as a substrate to from either the bipolar plate or monopolar plate of such a battery. A monopolar plate will differ in having the same polarity material provided on each surface thereof, and means to provide lateral conduction to provide for parallel connection of cell groupings.

Figure 5:
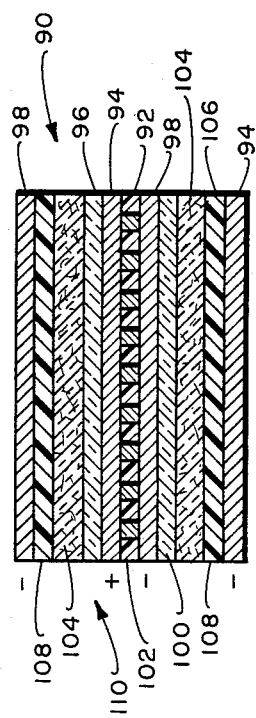
FIG. 5 is a sectional view of a cell for a bipolar battery.

Referring now to FIG. 5 a biplate grouping 90 can be assembled surounding a biplate 92 of the invention by supporting a layer 94 of positive active lead dioxide material on a first glass scrim sheet 96 and a layer 98 of negative active sponge lead on a second sheet 100 of glass scrim. These sheets 96, 100 are then placed against the plate 92 with the active layers 94, 98 in contact with the surfaces of the plate 82 and with the metal elements 102. The scrim sheets are in turn faced with a porous, fibrous mat 104 suitably formed from glass fibers. The porous mat is capable of releasing any gases formed during operation of the cell and holds the electrolyte. The sheets of scrim fabric may be bonded to the mats 104. By bonding an opposite polarity scrim sheet 106, 108 to each mat 104, a bipolar grouping can be assembled by alternating layers of plates 92 with bipolar porous mat assemblies 110.

The bipolar groupings can be interspersed with monopolar plates connected by bus bars to battery terminals. Alternately, the electrode materials can be plated directly onto the through conductive substrate plate of the invention. For example, sponge lead can be coated onto one surface and lead dioxide can be coated directly onto the other surface or indirectly onto lead stripes coated onto the opposite surface. Bipolar groupings are formed simply by interspersing a porous electrolyte-separator plate between the active material coated bipolar plate. The active materials can be applied as pastes and cured on the scrim or plate according to state of the art procedures. The active materials can also be formed in situ according to the state of the art by applying lead to each surface and then placing the electrode materials in electrolyte and connecting them to a source of potential.

It is to be realized that only preferred embodiments of the invention have been described and that numerous substitutions, modifications and alterations are permissible without departing from the spirit and scope of the invention as defined in the following claims.

I claim:

1. A fluid impervious plate for use as a substrate plate for a storage battery electrode comprising:
   a thin sheet of organic resin insulator having flat first and opposed faces and including a series of spaced, disconnected apertures extending from said first face to said opposite face; and a fluid-impervious conductor element consisting of metal having a spherically shaped side profile and flat first and second end surfaces sealingly received in each aperture; each conductor element being disconnected from every other conductor element and having said first and second end surfaces coincident with and exposed to said faces.

2. A plate according to claim 1 in which the resin is a thermoplastic resin.

3. A plate according to claim 2 in which the resin has a melting point below that of the metal.

4. A plate according to claim 2 in which the resin is a polyolefin.

5. A plate according to claim 4 in which the polyolefin is polypropylene.

6. A plate according to claim 1 in which the metal is lead.

7. A plate according to claim 1 in which the conductor element is a pellet swaged into said aperture.

8. A plate according to claim 1 in which the plate has a thickness from 5 to 100 mils.

9. A plate according to claim 8 in which the conductor elements are spaced in the plate in a uniform pattern with the distance from center to center being from 150 to 250 mils.

* * * * *